(12) United States Patent
Kamimura et al.

(10) Patent No.: US 10,053,154 B2
(45) Date of Patent: Aug. 21, 2018

(54) VEHICLE SIDE STRUCTURE

(71) Applicant: TOYOTA JIDOSHA KABUSHIKI KAISHA, Toyota-shi, Aichi-ken (JP)

(72) Inventors: Shinya Kamimura, Toyota (JP); Takuya Miura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/678,479

(22) Filed: Aug. 16, 2017

(65) Prior Publication Data

US 2018/0065680 A1 Mar. 8, 2018

(30) Foreign Application Priority Data

Sep. 8, 2016 (JP) .................................. 2016-175909

(51) Int. Cl.

| *B62D 25/04* | (2006.01) |
| *B60R 22/34* | (2006.01) |
| *B62D 25/02* | (2006.01) |
| *B62D 27/02* | (2006.01) |
| *B60R 22/24* | (2006.01) |

(52) U.S. Cl.
CPC .............. *B62D 25/04* (2013.01); *B60R 22/34* (2013.01); *B62D 25/025* (2013.01); *B60R 22/24* (2013.01); *B60R 2022/3402* (2013.01); *B62D 27/023* (2013.01)

(58) Field of Classification Search
CPC ...... B62D 25/04; B62D 25/025; B60R 22/34; B60R 22/24

USPC .................................................... 296/193.05
See application file for complete search history.

(56) References Cited

U.S. PATENT DOCUMENTS

| 6,808,225 | B2 * | 10/2004 | Moriyama | ............... B60J 5/043 |
| | | | | 296/146.6 |
| 8,262,152 | B2 * | 9/2012 | Okumura | ............. B62D 21/157 |
| | | | | 296/187.12 |
| 9,308,941 | B2 * | 4/2016 | Kanaguchi | ............. B62D 25/04 |
| 2016/0023683 | A1 | 1/2016 | Nishimura et al. | |

FOREIGN PATENT DOCUMENTS

| JP | 2016-022909 A | 2/2016 |
| JP | 2016-097878 A | 5/2016 |

* cited by examiner

*Primary Examiner* — Pinel E Romain
(74) *Attorney, Agent, or Firm* — Oliff PLC

(57) ABSTRACT

A vehicle side structure includes: a rocker disposed along a vehicle front-rear direction at a lower section of a vehicle side; and a pillar disposed along a vehicle up-down direction at the vehicle side whereby a lower end section of the pillar is joined to the rocker, the pillar including: a pillar inner panel disposed at a vehicle interior inner side, and a pillar outer panel disposed at a vehicle interior outer side of the pillar inner panel, and the pillar having an opening, formed at a lower section of the pillar inner panel, the pillar inner panel having formed therein a reinforcing section including an extended-out section that extends out toward an outer side in a vehicle width direction from an entire periphery of a peripheral edge of the opening, and a lower section of the reinforcing section being joined to an upper section of the rocker.

5 Claims, 6 Drawing Sheets

VEHICLE SIDE STRUCTURE

CROSS-REFERENCE TO RELATED APPLICATION

This application claims priority under 35 USC 119 from Japanese Patent Application No. 2016-175909 filed Sep. 8, 2016, the disclosure of which is incorporated by reference herein.

BACKGROUND

Technical Field

Technology of the present disclosure relates to a vehicle side structure.

Related Art

In order to mount a device such as, for example, a retractor (a seat belt winding device) of a seat belt device, or the like, in a lower section of a pillar inner panel of a vehicular pillar, a structure having an opening formed therein, is known (refer to, for example, Japanese Patent Application Laid-Open Publication No. 2016-22909 and Japanese Patent Application Laid-Open Publication No. 2016-97878).

SUMMARY

Incidentally, in cases in which the opening of the above-described kind is formed in the lower section of the pillar inner panel, rigidity of the lower section of the pillar inner panel ends up deteriorating. On the other hand, in a structure where a separate reinforcing member is attached to the lower section of the pillar inner panel, there is a disadvantage that the number of components increases.

One embodiment of the present invention provides a vehicle side structure where, in a configuration having an opening, for mounting a device formed at a lower section of a pillar inner panel, rigidity of the lower section of the pillar inner panel can be improved even in cases in which a separate reinforcing member is not provided.

A vehicle side structure according to a first aspect of technology of the present disclosure includes: a rocker disposed along a vehicle front-rear direction at a lower section of a vehicle side; and a pillar disposed along a vehicle up-down direction at the vehicle side whereby a pillar lower end section of the pillar is joined to the rocker, the pillar including: a pillar inner panel disposed at a vehicle interior inner side, and a pillar outer panel disposed at a vehicle interior outer side of the pillar inner panel, and the pillar having an opening, for mounting a device, formed at a pillar inner panel lower section of the pillar inner panel, the pillar inner panel having formed therein a reinforcing section including an extended-out section that extends out integrally toward an outer side in a vehicle width direction from an entire periphery of a peripheral edge of the opening, and a reinforcing section lower part of the reinforcing section being joined to an upper section of the rocker.

Due to the above-described configuration, an extended-out section of a reinforcing section is extended out integrally toward an outer side in a vehicle width direction from an entire periphery of a peripheral edge of an opening, for mounting a device of a pillar inner panel. As a result, rigidity of a pillar inner panel lower section of the pillar inner panel is increased. Moreover, a reinforcing section lower part of the reinforcing section is joined to an upper section of a rocker. Therefore, even if a load attempting to deform an opening side in the pillar inner panel acts, said load can be transmitted to the rocker, hence deformation of the opening side in the pillar inner panel is effectively suppressed.

A vehicle side structure according to a second aspect of technology of the present disclosure is the configuration according to the first aspect of technology of the present disclosure, wherein an extended-out section lower part of the extended-out section makes surface contact with an upper surface section of the rocker.

Due to the above-described configuration, an extended-out section lower part of the extended-out section makes surface contact with an upper surface section of the rocker, hence even if a load attempting to deform the opening side in the pillar inner panel acts, said load is transmitted to the upper surface section of the rocker via the extended-out section. Therefore, deformation of the opening side in the pillar inner panel is more effectively suppressed.

A vehicle side structure according to a third aspect of technology of the present disclosure is the configuration according to the second aspect of technology of the present disclosure, wherein the rocker includes: a rocker inner panel that configures a part at an inner side, in the vehicle width direction, of the rocker and that has a cross-section, as viewed along the vehicle width direction configured as a hat shape having an opening facing an outer side in the vehicle width direction; and a rocker outer panel that is disposed facing an outer side in the vehicle width direction of the rocker inner panel, that has a cross-section, as viewed along the vehicle width direction configured as a hat shape having an opening facing an inner side in the vehicle width direction, and that, together with the rocker inner panel, forms a closed cross-sectional section, and an end section at an outer side in the vehicle width direction of the extended-out section lower part is joined to an upper surface section of the rocker inner panel along a connecting part connecting the upper surface section with an upper end flange section of the rocker inner panel.

Due to the above-described configuration, an end section on an outer side in the vehicle width direction of the extended-out section lower part is joined to an upper surface section of the rocker inner panel along a connecting part connecting the upper surface section with an upper end flange section of the rocker inner panel. Now, the connecting part of the upper surface section and the upper end flange section in the rocker inner panel is a part of relatively high rigidity in the rocker inner panel. As a result, deformation of the extended-out section lower part of the extended-out section and therefore deformation of the lower section of the pillar inner panel is even more effectively suppressed.

A vehicle side structure according to a fourth aspect of technology of the present disclosure is the configuration according to any of the first through third aspects of technology of the present disclosure, wherein a vertical wall-like inner wall section configuring an end section side at an inner side, in the vehicle width direction, of the rocker has a ridge section formed therein along the vehicle front-rear direction, and a pillar inner panel lower end section of the pillar inner panel is joined to the inner wall section of the rocker along the ridge section.

Due to the above-described configuration, a vertical wall-like inner wall section configuring an end section side on an inner side in the vehicle width direction in the rocker has a ridge section formed therein along the vehicle front-rear direction, and the ridge section configures a part of relatively high rigidity in the inner wall section. Moreover, since a pillar inner panel lower end section of the pillar inner panel is joined to the inner wall section of the rocker along such a high-rigidity ridge section, deformation of the lower end section of the pillar inner panel joined to the rocker is more effectively suppressed.

A vehicle side structure according to a fifth aspect of technology of the present disclosure is the configuration according to any of the first aspect of technology of the present disclosure, the second aspect of technology of the present disclosure, the fourth aspect citing the first aspect of technology of the present disclosure, and the fourth aspect citing the second aspect of technology of the present disclosure, wherein an end section at an outer side in the vehicle width direction of the reinforcing section includes a projecting section that projects integrally in a flange shape from an entire periphery of an end section at an outer side in the vehicle width direction of the extended-out section, an upper end section side of the rocker has formed therein: a first upper surface section; a second upper surface section disposed further toward an outer side in the vehicle width direction than the first upper surface section whereby the second upper surface section is provided at a position that is lower in the vehicle up-down direction than the first upper surface section; and a level difference surface joining the first upper surface section and the second upper surface section, and the projecting section is joined to the level difference surface at a reinforcing section lower end part of the reinforcing section.

Due to the above-described configuration, an end section at an outer side in the vehicle width direction of the reinforcing section includes a projecting section that projects integrally in a flange shape from an entire periphery of an end section on an outer side in the vehicle width direction of the extended-out section, hence rigidity of the pillar inner panel lower section of the pillar inner panel is more increased. Moreover, an upper end section side of the rocker has formed therein: a first upper surface section; a second upper surface section disposed further toward an outer side in the vehicle width direction than the first upper surface section whereby the second upper surface section is provided at a position that is lower in the vehicle up-down direction than the first upper surface section; and a level difference surface joining the first upper surface section and the second upper surface section, and the projecting section is joined to the level difference surface on an upper end section side of the rocker in a lower end section of the reinforcing section. Therefore, when a load attempting to displace the pillar inner panel to an upper side of the vehicle has acted, the previously mentioned load acts, on a joining section of the level difference surface and the projecting section, as a load in a shearing direction, not as a load in a detaching direction, hence the reinforcing section is less readily detached from the rocker compared to in a structure of the kind where, for example, a load in the detaching direction is received.

As described above, due to the vehicle side structure of technology of the present disclosure, a configuration in which an opening, for mounting a device, formed at a pillar inner panel lower section of a pillar inner panel has an excellent effect that rigidity of the lower section of the pillar inner panel can be improved even when a separate reinforcing member is not provided.

BRIEF DESCRIPTION OF THE DRAWINGS

Exemplary embodiments of the present invention will be described in detail based on the following figures, wherein.

DETAILED DESCRIPTION

First Embodiment

A vehicle side structure according to a first embodiment of technology of the present disclosure will be described using FIGS. 1 to 3. Note that regarding arrows FR, UP, and IN appropriately indicated in these drawings, the arrow FR indicates a front side of a vehicle, the arrow UP indicates an upper side of the vehicle, and the arrow IN indicates an inner side in a vehicle width direction.

Figure 1:
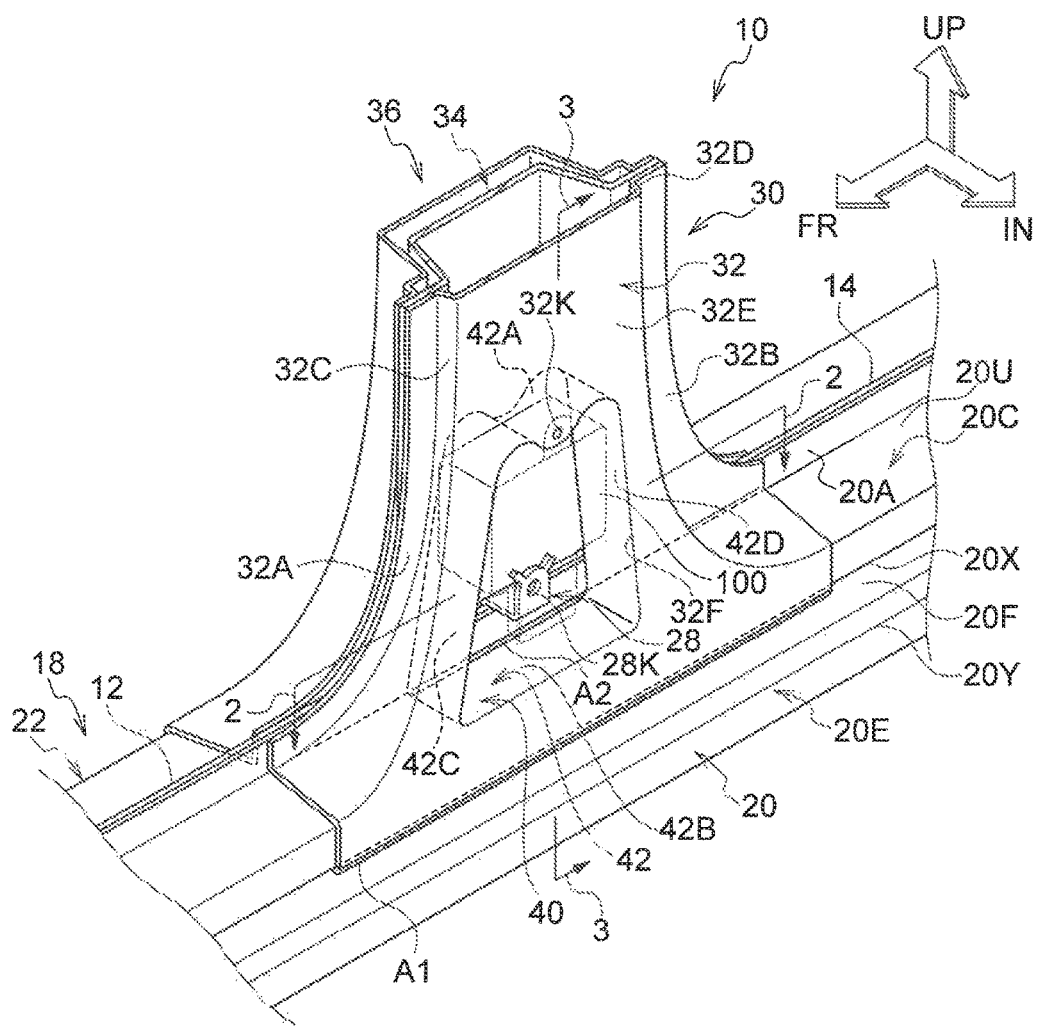
FIG. 1 is a perspective view showing an overall configuration of a vehicle side structure according to a first embodiment of technology of the present disclosure in a state of being seen from an inner side in a vehicle width direction.

FIG. 1 shows an overall configuration of the vehicle side structure according to the present embodiment in a perspective view of a state of being seen from an inner side in the vehicle width direction. In addition, FIG. 2 shows an enlarged plane cross-sectional view enlarging a state of a section taken along the line 2-2 of FIG. 1; and FIG. 3 shows an enlarged vertical cross-sectional view enlarging a state of a section taken along the line 3-3 of FIG. 1.

As shown in FIG. 1 as an example, a front door opening 12 opened/closed by an unillustrated front side door is formed on a front side of a vehicle side 10, and a rear door opening 14 opened/closed by an unillustrated rear side door is formed on a rear side of the vehicle side 10. A rocker 18 (also called a side sill) is disposed along a vehicle front-rear direction on lower edge sides of the front door opening 12 and the rear door opening 14, that is, in a lower section of the vehicle side 10. The rocker 18 configures a vehicle body skeletal member.

Figure 3:
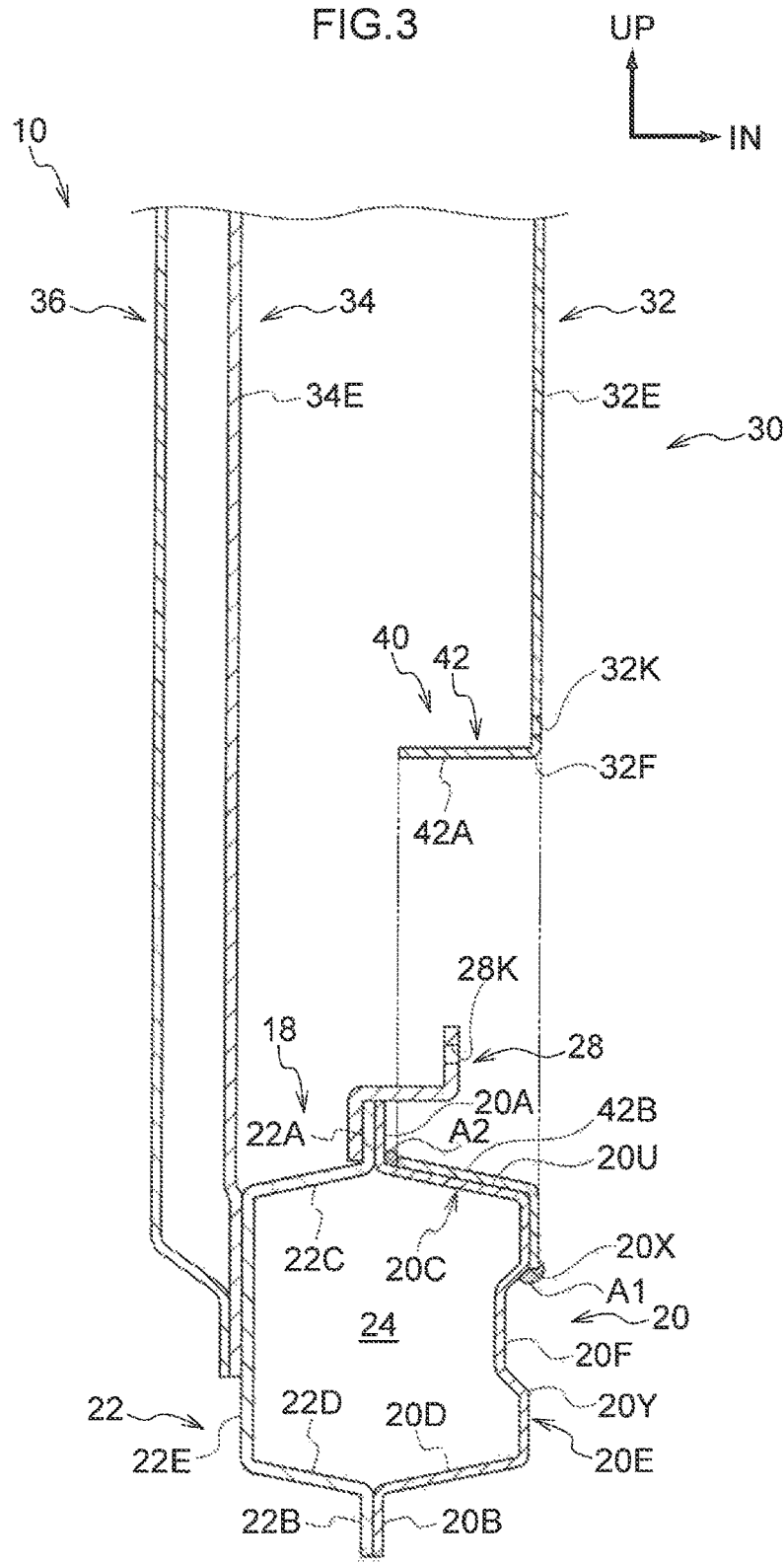
FIG. 3 is an enlarged vertical cross-sectional view showing enlarged a state of a section taken along the line 3-3 of FIG. 1.

As shown in FIG. 3 as an example, the rocker 18 includes rocker inner panel 20 configuring a part on an inner side in the vehicle width direction of the rocker 18. The rocker inner panel 20 is disposed having the vehicle front-rear direction as its longitudinal direction, and has a cross-sectional shape in a case in which sectioned along the vehicle width direction configured as a hat shape having an opening facing an outer side in the vehicle width direction. An upper end flange section 20A is formed in an upper end section of the rocker inner panel 20, and a lower end flange section 20B is formed in a lower end section of the rocker inner panel 20. In addition, the rocker inner panel 20 includes an upper wall section 20C extended out bent to an inner side in the vehicle width direction from a lower end section of the upper end flange section 20A, and includes a lower wall section 20D extended out bent to an inner side in the vehicle width direction from an upper end section of the lower end flange section 20B. An end section on an inner side in the vehicle width direction of the upper wall section 20C and an end section on an inner side in the vehicle width direction of the lower wall section 20D are joined in a vehicle up-down direction by a vertical wall-like inner wall section 20E.

The inner wall section 20E configures an end section side on an inner side in the vehicle width direction of the rocker 18. A recessed bead 20F extending along the vehicle front-rear direction recessed to an outer side in the vehicle width direction, is formed in a middle section in the vehicle up-down direction of the inner wall section 20E. Moreover, ridge sections 20X, 20Y are formed along the vehicle front-rear direction in the inner wall section 20E at boundary sections of ordinary sections of the inner wall section 20E and the recessed bead 20F.

In addition, the rocker 18 includes a rocker outer panel 22 disposed facing an outer side in the vehicle width direction of the rocker inner panel 20. The rocker outer panel 22 is disposed having the vehicle front-rear direction as its longitudinal direction, and has a cross-sectional shape in a case in which sectioned along the vehicle width direction configured as a hat shape having an opening facing an inner side in the vehicle width direction. An upper end flange section 22A is formed in an upper end section of the rocker outer panel 22, and a lower end flange section 22B is formed in a lower end section of the rocker outer panel 22. In addition, the rocker outer panel 22 includes an upper wall section 22C extended out bent to an outer side in the vehicle width direction from a lower end section of the upper end flange section 22A, and includes a lower wall section 22D extended out bent to an outer side in the vehicle width direction from an upper end section of the lower end flange section 22B. An end section on an outer side in the vehicle width direction of the upper wall section 22C and an end section on an outer side in the vehicle width direction of the lower wall section 22D are joined in the vehicle up-down direction by a vertical wall-like outer wall section 22E.

The upper end flange section 20A of the rocker inner panel 20 and the upper end flange section 22A of the rocker outer panel 22 are joined by spot welding. In addition, the lower end flange section 20B of the rocker inner panel 20 and the lower end flange section 22B of the rocker outer panel 22 are joined by spot welding. That is, the rocker 18 forms a closed cross-sectional section 24 by the rocker inner panel 20 and the rocker outer panel 22.

As shown in FIG. 1 as an example, a center pillar 30 acting as a pillar is erected to the upper side of the vehicle from a middle section in the longitudinal direction of the rocker 18. The center pillar 30 configures a vehicle body skeletal member, is disposed along the vehicle up-down direction in the vehicle side 10, and has its lower end section (a pillar lower end section according to technology of the present disclosure) joined to the rocker 18 (details will be mentioned later). An upper end section of the center pillar 30 is connected to a middle section in a longitudinal direction of an unillustrated roof side rail. Note that the previously mentioned roof side rail is disposed along the vehicle front-rear direction in an upper section of the vehicle side 10.

The center pillar 30 includes a pillar inner panel 32 disposed on a vehicle interior inner side. The pillar inner panel 32 is disposed having the vehicle up-down direction as its longitudinal direction, and a cross-section, as viewed along the vehicle front-rear direction, of a part more to the upper side than the rocker 18 and more to the lower side than the previously mentioned roof side rail, of the pillar inner panel 32 is basically configured as a hat shape having an opening facing an outer side in the vehicle width direction.

Figure 2:
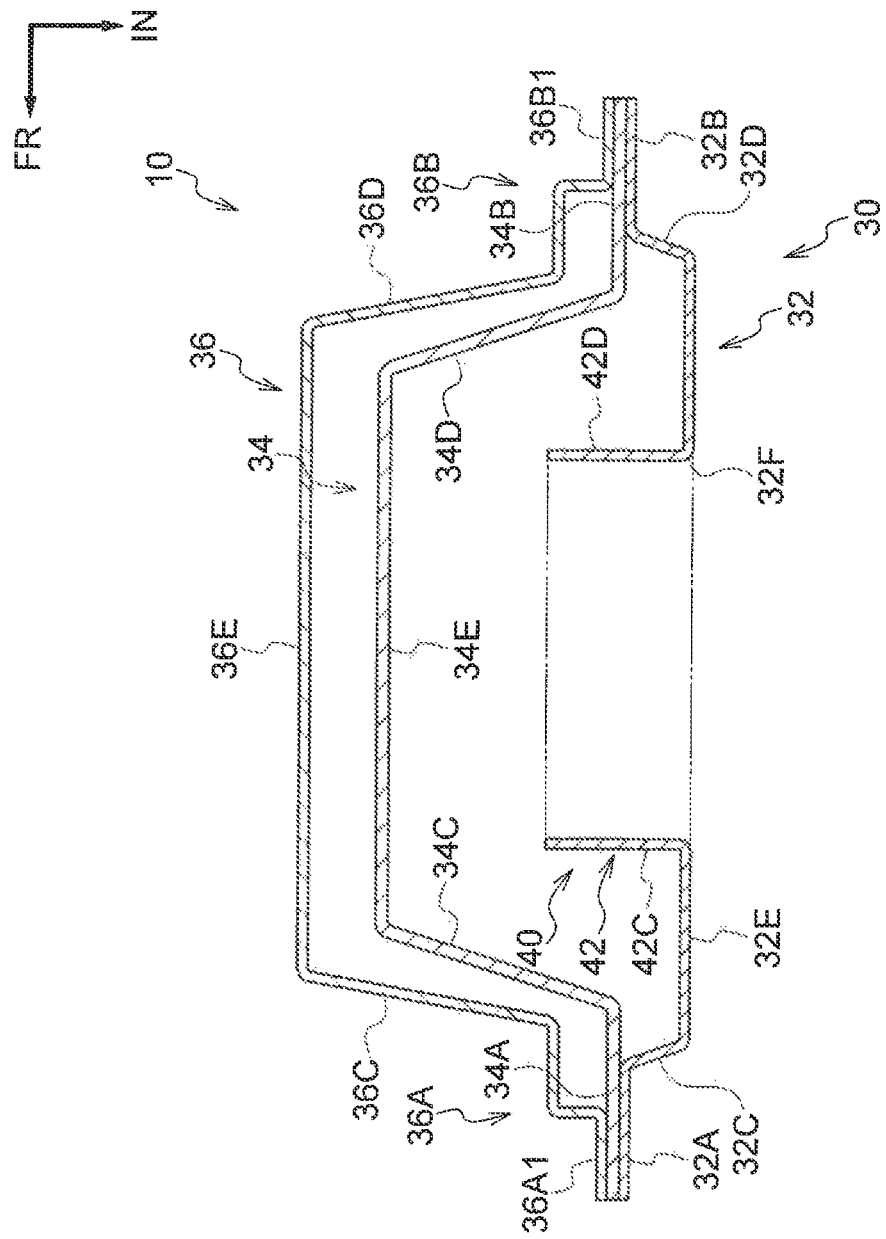
FIG. 2 is an enlarged plane cross-sectional view showing enlarged a state of a section taken along the line 2-2 of FIG. 1.

As shown in FIGS. 1 and 2 as an example, a front end flange section 32A is formed in a front end section of the pillar inner panel 32, and a rear end flange section 32B is formed in a rear end section of the pillar inner panel 32. In addition, the pillar inner panel 32 includes a front wall section 32C extended out bent to an inner side in the vehicle width direction from a rear end section of the front end flange section 32A, and includes a rear wall section 32D extended out bent to an inner side in the vehicle width direction from a front end section of the rear end flange section 32B. As shown in FIG. 1 as an example, an end section on an inner side in the vehicle width direction of the front wall section 32C and an end section on an inner side in the vehicle width direction of the rear wall section 32D are joined in the vehicle front-rear direction by an interior inner wall section 32E.

A lower end section side of the interior inner wall section 32E of the pillar inner panel 32 is overlapped from an inner side in the vehicle width direction on an upper section of the inner wall section 20E of the rocker inner panel 20, and extends to the ridge section 20X of the rocker inner panel 20. Moreover, a lower end section of the interior inner wall section 32E is joined, by arc welding, to the inner wall section 20E of the rocker inner panel 20, along the ridge section 20X. Note that in FIGS. 1 and 3, an arc welding section of a lower extremity of the interior inner wall section 32E and the inner wall section 20E of the rocker inner panel 20 is indicated by the reference character A1.

Moreover, as shown in FIG. 1 as an example, an opening 32F for mounting a retractor (a seat belt winding device) 100 of a seat belt device (illustration of which is omitted) is formed in a lower section (a pillar inner panel lower section according to technology of the present disclosure) of the interior inner wall section 32E of the pillar inner panel 32. A lower edge section of the opening 32F extends linearly along the vehicle front-rear direction. Note that in order to make the diagrams easy to see, in FIG. 1, the retractor 100 is schematically shown by a two dot-chain line, and in FIG. 3, illustration of the retractor 100 (refer to FIG. 1) is omitted. As shown in FIG. 1 as an example, in the interior inner wall section 32E, a middle section in the vehicle front-rear direction of an upper edge section of the opening 32F projects slightly further toward a downward side than a part further toward the front side of the vehicle and a part further toward the rear side of the vehicle than the middle section in the vehicle front-rear direction of the upper edge section of the opening 32F, and an attachment hole 32K for attaching an upper section of the retractor 100 is formed penetrating a portion projecting in such a way.

Moreover, as shown in FIG. 3 as an example, an attachment bracket 28 for attaching a lower section of the retractor 100 (refer to FIG. 1) is fixed to the upper end flange section 22A of the rocker outer panel 22. An attachment hole 28K is formed penetrating an upper section of the attachment bracket 28.

Moreover, as shown in FIG. 1 as an example, a pillar outer panel 36 is disposed on a vehicle interior outer side of the pillar inner panel 32. The pillar outer panel 36 that configures part of the center pillar 30 is disposed having the vehicle up-down direction as its longitudinal direction, and has a cross-sectional shape, as viewed along the vehicle front-rear direction, configured as a hat shape having an opening facing an inner side in the vehicle width direction.

As shown in FIG. 2 as an example, a front side flange section 36A is formed on a front end section side of the pillar outer panel 36, and a rear side flange section 36B is formed in a rear end section of the pillar outer panel 36. Note that the front side flange section 36A and the rear side flange section 36B are configured including a level difference in the vehicle width direction, and a front end section 36A1 of the front side flange section 36A and a rear end section 36B1 of the rear side flange section 36B are configured as parts for joining to the pillar inner panel 32, and so on. In addition, the pillar outer panel 36 includes a front wall section 36C extended out bent to an outer side in the vehicle width direction from a rear end section of the front side flange section 36A, and includes a rear wall section 36D extended out bent to an outer side in the vehicle width direction from a front end section of the rear side flange section 36B. An end section on an outer side in the vehicle width direction of the front wall section 36C and an end section on an outer side in the vehicle width direction of the rear wall section 36D are joined in the vehicle front-rear direction by an outer vertical wall section 36E.

In addition, the center pillar 30 includes a pillar outer reinforcement 34 (hereafter, abbreviated to "pillar outer RE 34") between the pillar inner panel 32 and the pillar outer panel 36. As shown in FIG. 1 as an example, the pillar outer RF 34 is disposed having the vehicle up-down direction as its longitudinal direction, and a part thereof further toward an upward side than the rocker 18 and further toward a downward side than the roof side rail (illustration of which is omitted) has a cross-sectional shape, as viewed along the vehicle front-rear direction, configured as a hat shape having an opening facing an inner side in the vehicle width direction.

As shown in FIG. 2 as an example, a front end flange section 34A is formed in a front end section of the pillar outer RF 34, and a rear end flange section 34B is formed in a rear end section of the pillar outer RF 34. In addition, the pillar outer RF 34 includes a front wall section 34C extended out bent to an outer side in the vehicle width direction from a rear end section of the front end flange section 34A, and includes a rear wall section 34D extended out bent to an outer side in the vehicle width direction from a front end section of the rear end flange section 34B. An end section on an outer side in the vehicle width direction of the front wall section 34C and an end section on an outer side in the vehicle width direction of the rear wall section 34D are joined in the vehicle front-rear direction by an interior outer wall section 34E. As shown in FIG. 3 as an example, a lower end section of the interior outer wall section 34E of the pillar outer RE 34, along with a lower end section of the pillar outer panel 36, is joined by spot welding to a surface on an outer side in the vehicle width direction of the outer wall section 22E of the rocker outer panel 22.

As shown in FIG. 2 as an example, the front end flange section 32A of the pillar inner panel 32, the front end flange section 34A of the pillar outer RF 34, and the front end section 36A1 of the front side flange section 36A of the pillar outer panel 36 are joined by spot welding in a state of being triply overlaid. Moreover, the rear end flange section 32B of the pillar inner panel 32, the rear end flange section 34B of the pillar outer RF 34, and the rear end section 36B1 of the rear side flange section 36B of the pillar outer panel 36 are joined by spot welding in a state of being triply overlaid.

On the other hand, as shown in FIG. 1 as an example, an extended-out section 42 is extended out integrally (continuously) toward an outer side in the vehicle width direction from an entire periphery of a peripheral edge of the opening 32F of the pillar inner panel 32. A reinforcing section 40 including this extended-out section 42 has its lower section joined to an upper section of the rocker 18. Note that the present embodiment is the case where the reinforcing section 40 does not include a configuring section other than the extended-out section 42. A configuration of the reinforcing section 40 will be described more specifically below.

The extended-out section 42 is formed in a substantially rectangular cylindrical shape. The extended-out section 42 has its upper end section side configured by an upper wall section 42A and has its lower end section side configured by a lower wall section 42B. The upper wall section 42A is formed such that its middle section in the vehicle front-rear direction is positioned slightly to a downward side with respect to a part further toward the front side of the vehicle and a part further toward the rear side of the vehicle than the middle section in the vehicle front-rear direction of the upper wall section 42A, and the lower wall section 42B is formed in a flat plate shape. A front end section side of the extended-out section 42 has an end section on the front side of the vehicle of the upper wall section 42A and an end section on the front side of the vehicle of the lower wall section 42B joined in substantially the vehicle up-down direction by a front wall section 42C. Moreover, a rear end section side of the extended-out section 42 has an end section on the rear side of the vehicle of the upper wall section 42A and an end section on the rear side of the vehicle of the lower wall section 42B joined in substantially the vehicle up-down direction by a rear wall section 42D.

As shown in FIG. 3 as an example, a lower section (an extended-out section lower part according to technology of the present disclosure) of the extended-out section 42, more specifically the lower wall section 42B makes surface contact with an upper surface section 20U of the upper wall section 20C of the rocker inner panel 20 (part of an upper surface section of the rocker 18). An end section on an outer side in the vehicle width direction of the lower wall section 42B in the extended-out section 42 is joined, by arc welding, to the upper surface section 20U in the rocker inner panel 20, along a connecting part of the upper surface section 20U and the upper end flange section 20A in the rocker inner panel 20. Note that in FIGS. 1 and 3, an arc welding section of the end section on an outer side in the vehicle width direction of the lower wall section 42B in the extended-out section 42 and the upper surface section 20U in the rocker inner panel 20 is indicated by the reference character A2.

Actions and Effects

Next, actions and effects of the above-described embodiment will be described.

In the present embodiment, as shown in FIG. 1 as an example, the extended-out section 42 of the reinforcing section 40 is extended out integrally toward an outer side in the vehicle width direction from an entire periphery of a peripheral edge of the opening 32F of the pillar inner panel 32. As a result, stress concentration at the peripheral edge of the opening 32F of the pillar inner panel 32 is suppressed, and rigidity of the lower section of the pillar inner panel 32 is increased. In addition, the lower section of the reinforcing section 40 is joined to the upper section of the rocker 18. Therefore, even if a load attempting to deform an opening 32F side in the pillar inner panel 32 acts during a collision, and so on, the load can be transmitted to the rocker 18, hence deformation of the opening 32F side in the pillar inner panel 32 is effectively suppressed.

Moreover, the lower wall section 42B of the extended-out section 42 makes surface contact with the upper surface section 20U of the rocker inner panel 20. Therefore, even if a load attempting to deform the opening 32F side in the pillar inner panel 32 acts, the load is transmitted to the upper surface section 20U of the rocker inner panel 20 via the extended-out section 42. Therefore, deformation of the opening 32F side in the pillar inner panel 32 is more effectively suppressed.

In addition, the end section on an outer side in the vehicle width direction of the lower wall section 42B of the extended-out section 42 is joined to the upper surface section 20U in the rocker inner panel 20 along a connecting part of the upper surface section 20U and the upper end flange section 20A in the rocker inner panel 20. Here, the connecting part of the upper surface section 20U and the upper end flange section 20A in the rocker inner panel 20 is a part of relatively high rigidity in the rocker inner panel 20. Therefore, deformation of the lower wall section 42B of the extended-out section 42 and furthermore deformation of the lower section of the pillar inner panel 32 is even more effectively suppressed.

Furthermore, the ridge section 20X is formed along the vehicle front-rear direction in the vertical wall-like inner wall section 20E configuring the end section side on an inner side in the vehicle width direction in the rocker 18, and the ridge section 20X configures a part of relatively high rigidity in the inner wall section 20E. Moreover, since the lower end section (a pillar inner panel lower end section according to technology of the present disclosure) of the pillar inner panel 32 is joined to the inner wall section 20E of the rocker 18 along such a high-rigidity ridge section 20X, deformation of the lower end section of the pillar inner panel 32 joined to the rocker 18 is more effectively suppressed.

As described above, due to the vehicle side structure of the present embodiment, a configuration having the retractor mounting-dedicated opening 32F formed in the lower section of the pillar inner panel 32 makes it possible for rigidity of the lower section of the pillar inner panel 32 to be improved even in a case in which a separate reinforcing member is not provided.

Second Embodiment

Figure 4:
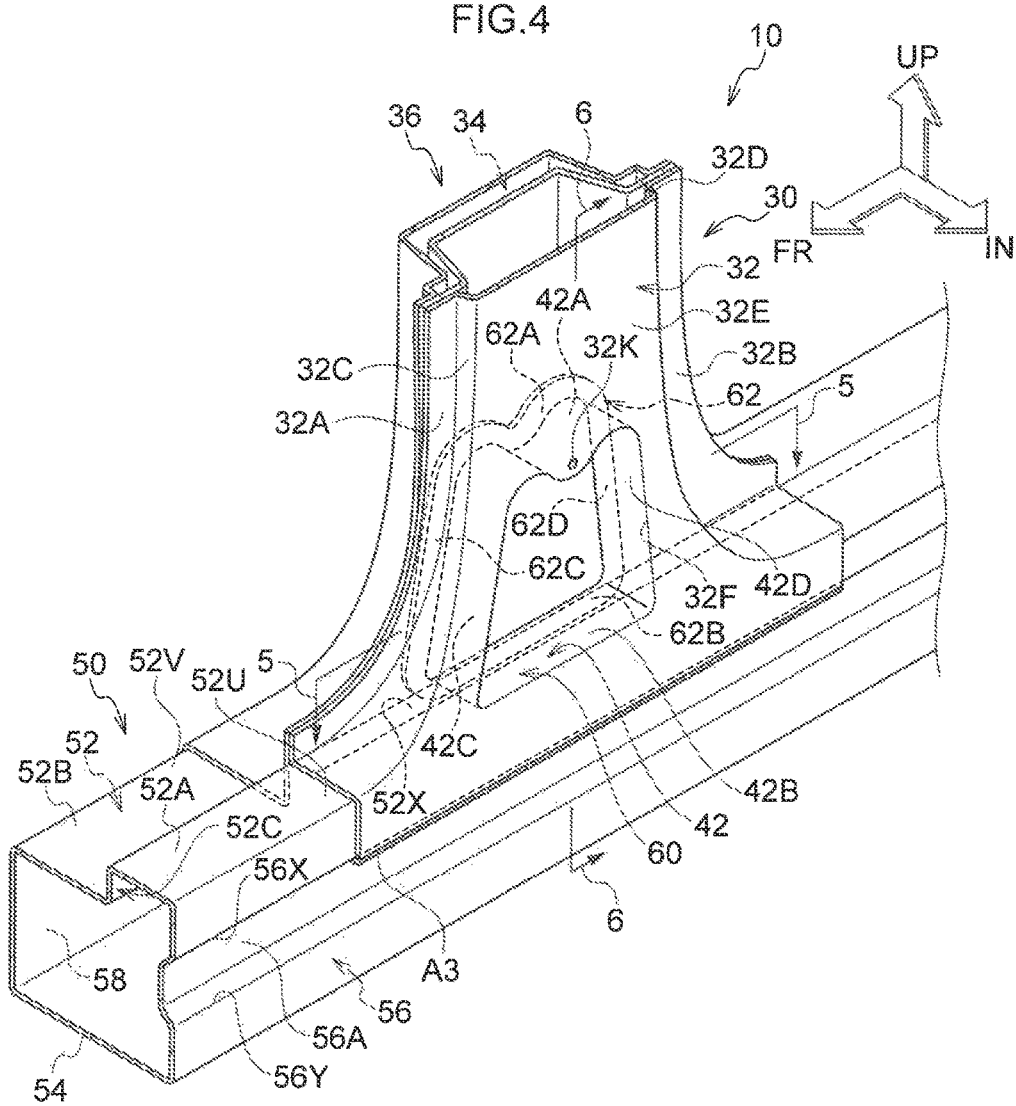
FIG. 4 is a perspective view showing an overall configuration of a vehicle side structure according to a second embodiment of technology of the present disclosure in a state of being seen from an inner side in a vehicle width direction.
Figure 5:
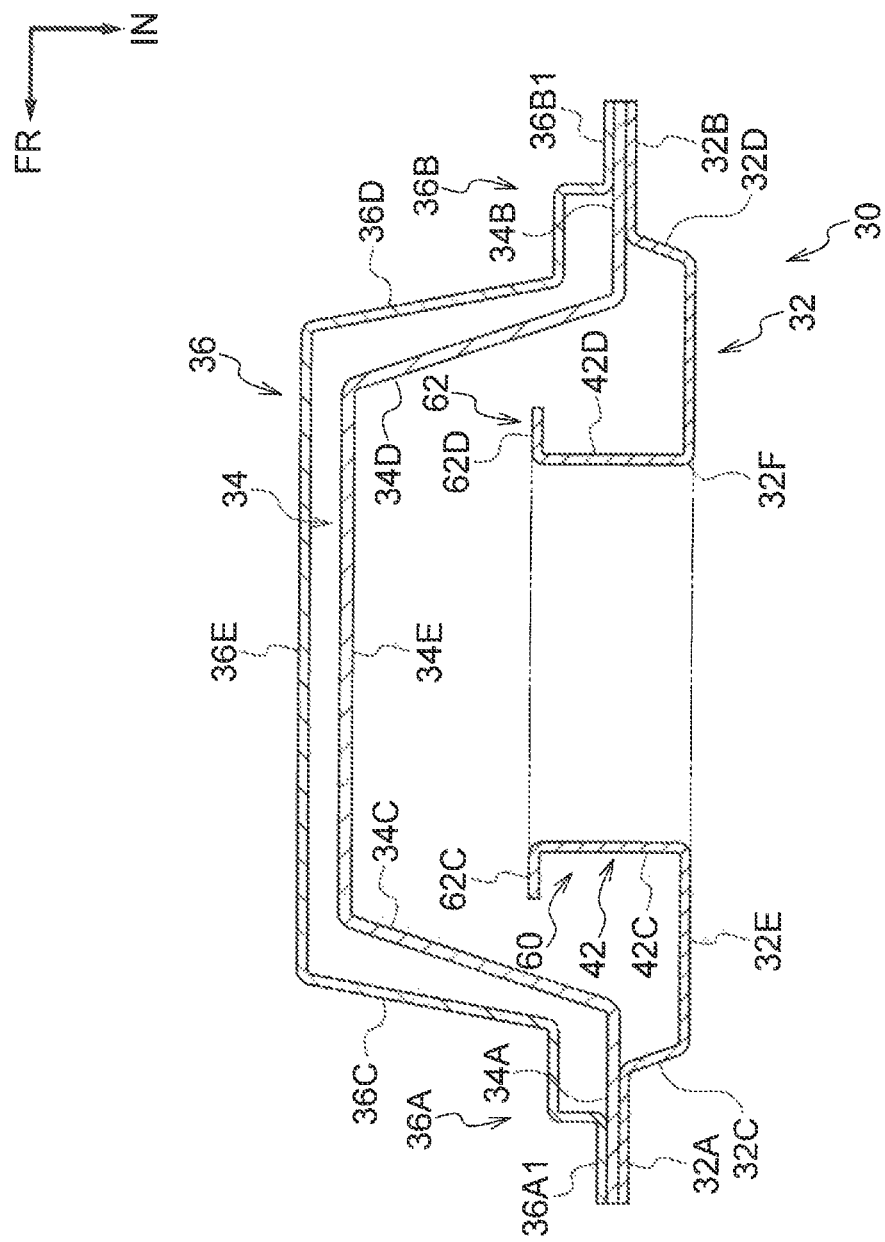
FIG. 5 is an enlarged plane cross-sectional view showing enlarged a state of a section taken along the line 5-5 of FIG. 4.

Next, a vehicle side structure according to a second embodiment of technology of the present disclosure will be described using FIGS. 4 to 6. FIG. 4 shows an overall configuration of the vehicle side structure according to the present embodiment in a perspective view of a state of being seen from an inner side in the vehicle width direction. In addition, FIG. 5 shows an enlarged plane cross-sectional view enlarging a state of a section taken along the line 5-5 of FIG. 4; and FIG. 6 shows an enlarged vertical cross-sectional view enlarging a state of a section taken along the line 6-6 of FIG. 4.

Note that the present embodiment substantively has a similar configuration to the first embodiment excluding a configuration of a rocker 50 and a configuration of a reinforcing section 60. Hence, in the present embodiment, configuring sections substantively similar to those of the first embodiment will be assigned with identical symbols to those assigned in the first embodiment, and descriptions thereof will be omitted. Moreover, the pillar inner panel 32 has a similar configuration to the pillar inner panel 32 of the first embodiment (refer to FIGS. 1 to 3) excluding the reinforcing section 60, hence for convenience, will be assigned with identical symbols to those assigned in the first embodiment. Moreover, in order to make the diagrams easy to see, in FIGS. 4 and 6, illustration of the retractor 100 (refer to FIG. 1) and the retractor attachment-dedicated attachment bracket 28 (refer to FIGS. 1 and 3) is omitted.

Figure 6:
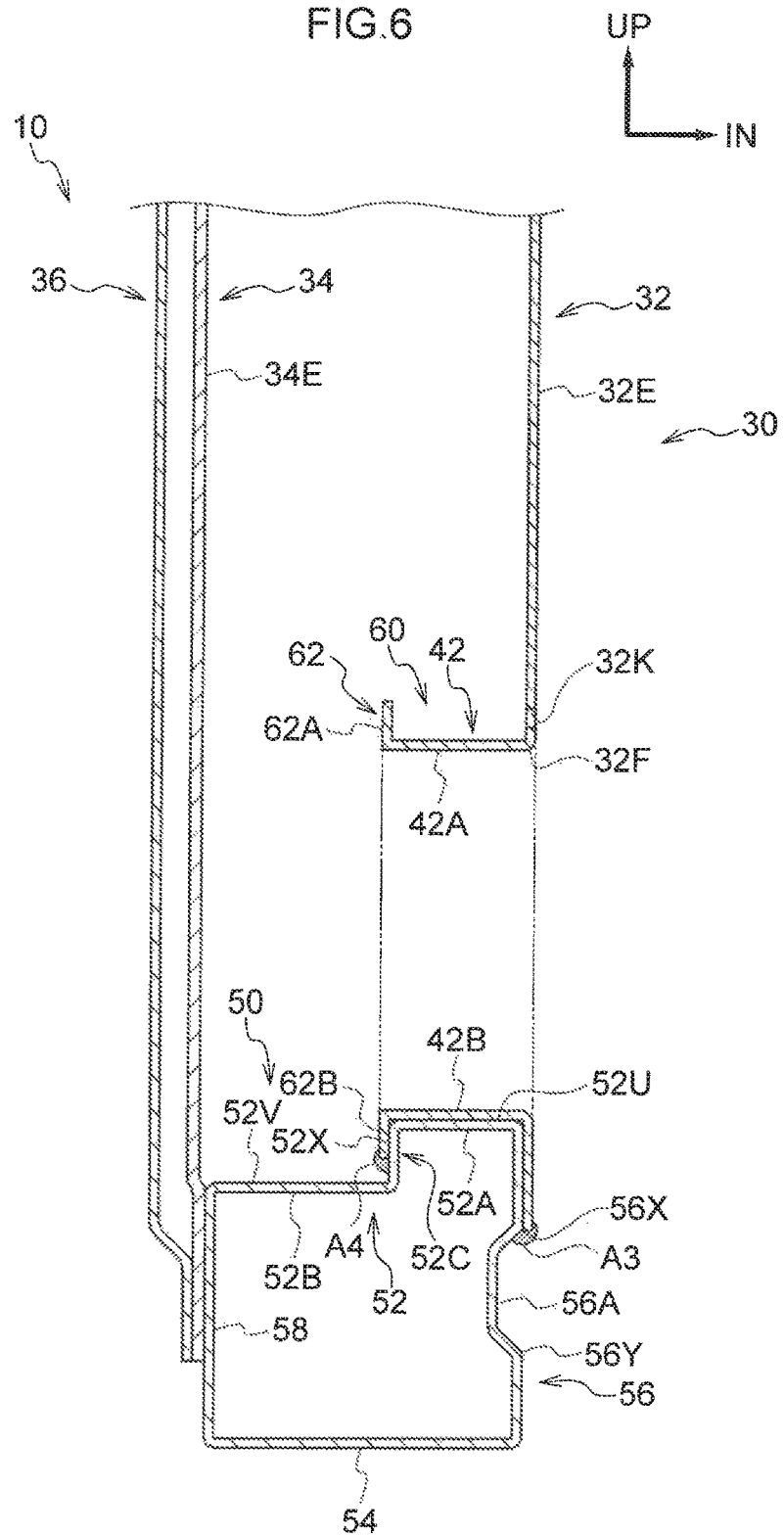
FIG. 6 is an enlarged vertical cross-sectional view showing enlarged a state of a section taken along the line 6-6 of FIG. 4.

In the present embodiment, as shown in FIGS. 4 and 6 as an example, instead of the rocker 18 of the first embodiment (refer to FIGS. 1 and 2), the rocker 50 is disposed along the vehicle front-rear direction in a lower section of the vehicle side 10. The rocker 50 is formed integrally in a substantially rectangular cylindrical shape and has a configuration not including flange sections at its upper and lower ends.

As shown in FIG. 4 as an example, an upper wall section 52 including a level difference structure is formed on an upper end side of the rocker 50, and a flat plate shaped lower wall section 54 is formed on a lower end side of the rocker 50. The upper wall section 52 includes a first upper wall section 52A configuring a part on an inner side in the vehicle width direction of the upper wall section 52, and includes a second upper wall section 52B disposed further toward an outer side in the vehicle width direction than the first upper wall section 52A to be provided at a position which is lower in the vehicle up-down direction than the first upper wall section 52A. An end section on an outer side in the vehicle width direction of the first upper wall section 52A and an end section on an inner side in the vehicle width direction of the second upper wall section 52B are joined in the vehicle up-down direction by a level difference section 52C. As a result, a first upper surface section 52U of the first upper wall section 52A and a second upper surface section 52V of the second upper wall section 52B are joined on an upper end section side of the rocker 50, whereby a level difference surface 52X (refer to FIG. 6) facing an outer side in the vehicle width direction is formed.

An end section on an outer side in the vehicle width direction of the upper wall section 52 and an end section on an outer side in the vehicle width direction of the lower wall section 54 are joined in the vehicle up-down direction by a vertical wall-like outer wall section 58. The outer wall section 58 is formed in a flat plate shape to configure an end section on an outer side in the vehicle width direction of the rocker 50. In addition, an end section on an inner side in the vehicle width direction of the upper wall section 52 and an end section on an inner side in the vehicle width direction of the lower wall section 54 are joined in the vehicle up-down direction by a vertical wall-like inner wall section 56. The inner wall section 56 configures an end section side on an inner side in the vehicle width direction of the rocker 50. A recessed head 56A extending along the vehicle front-rear direction recessed to an outer side in the vehicle width direction, is formed in a middle section in the vehicle up-down direction of the inner wall section 56. Moreover, ridge sections 56X, 56Y are formed along the vehicle front-rear direction in the inner wall section 56 at boundary sections of ordinary sections of the inner wall section 56 and the recessed bead 56A.

The lower end section side of the interior inner wall section 32E of the pillar inner panel 32 is overlapped from an inner side in the vehicle width direction on an upper section of the inner wall section 56 of the rocker 50, and extends to the ridge section 56X of the rocker 50. Moreover, a lower extremity of the interior inner wall section 32E is joined, by arc welding, to the inner wall section 56 of the rocker 50, along the ridge section 56X. Note that in FIGS. 4 and 6, an arc welding section of the lower extremity of the interior inner wall section 32E and the inner wall section 56 of the rocker 50 is indicated by the reference character A3.

On the other hand, as shown in FIGS. 4 to 6 as an example, the pillar inner panel 32 includes the extended-out section 42 extended out integrally toward an outer side in the vehicle width direction from the entire periphery of the peripheral edge of the opening 32F of the pillar inner panel 32, similarly to in the first embodiment. As shown in FIG. 6 as an example, the lower section in the extended-out section 42, more specifically the lower wall section 42B makes surface contact with the first upper surface section 52U of the first upper wall section 52A of the rocker 50. In the present embodiment, the reinforcing section 60 including such an extended-out section 42 has its lower section joined to an upper section of the rocker 50.

Describing more specifically, as shown in FIGS. 4 to 6 as an example, an end section on an outer side in the vehicle width direction of the reinforcing section 60 includes a projecting section 62 that projects integrally in a flange shape from an entire periphery of an end section on an outer side in the vehicle width direction of the extended-out section 42. As shown in FIGS. 4 and 6 as an example, an upper end section side of the projecting section 62 is configured as an upper side projecting section 62A projecting to the upper side of the vehicle from an end section on an outer side in the vehicle width direction of the upper wall section 42A in the extended-out section 42, and a lower end section side of the projecting section 62 is configured as a lower side projecting section 62B projecting to the lower side of the vehicle from an end section on an outer side in the vehicle width direction of the lower wall section 42B in the extended-out section 42. In addition, as shown in FIGS. 4 and 5 as an example, a front end section side of the projecting section 62 is configured as a front side projecting section 62C projecting to the front side of the vehicle from an end section on an outer side in the vehicle width direction of the front wall section 42C in the extended-out section 42, and a rear end section side of the projecting section 62 is configured as a rear side projecting section 62D projecting to the rear side of the vehicle from an end section on an outer side in the vehicle width direction of the rear wall section 42D in the extended-out section 42. Moreover, as shown in FIG. 6 as an example, in a lower end section (a reinforcing section lower end part according to technology of the present disclosure) of the reinforcing section 60, a lower end section of the lower side projecting section 62B is joined, by arc welding, to the level difference surface 52X, over an entire region of the lower end section of the lower side projecting section 62B. Note that in FIG. 6, an arc welding section of the projecting section 62 and the level difference surface 52X is indicated by the reference character A4.

Actions and Effects

Next, actions and effects of the above-described embodiment will be described.

In the present embodiment, as shown in FIG. 4 as an example, the reinforcing section 60 of the pillar inner panel 32 includes the extended-out section 42 extended out integrally toward an outer side in the vehicle width direction from the entire periphery of the peripheral edge of the opening 32F of the pillar inner panel 32, hence rigidity of the lower section of the pillar inner panel 32 is increased. In addition, the lower section of the reinforcing section 60 is joined to the upper section of the rocker 50. Therefore, even if a load attempting to deform the opening 32F side in the pillar inner panel 32 acts during a collision, and so on, the load can be transmitted to the rocker 50, hence deformation of the opening 32F side in the pillar inner panel 32 is effectively suppressed.

Moreover, the lower wall section 42B of the extended-out section 42 makes surface contact with the first upper surface section 52U of the rocker 50. Therefore, even if a load attempting to deform the opening 32F side in the pillar inner panel 32 acts, said load is transmitted to the first upper surface section 52U of the rocker 50 via the extended-out section 42. Therefore, deformation of the opening 32F side in the pillar inner panel 32 is more effectively suppressed.

In addition, the ridge section 56X is formed along the vehicle front-rear direction in the vertical wall-like inner wall section 56 configuring the end section side on an inner side in the vehicle width direction in the rocker 50, and the ridge section 56X configures a part of relatively high rigidity in the inner wall section 56. Moreover, since the lower end section of the interior inner wall section 32E of the pillar inner panel 32 is joined to the inner wall section 56 of the rocker 50 along such a high-rigidity ridge section 56X, deformation of the lower end section of the interior inner wall section 32E of the pillar inner panel 32 joined to the rocker 50 is more effectively suppressed.

Furthermore, the end section on an outer side in the vehicle width direction of the reinforcing section 60 includes the projecting section 62 that projects integrally in a flange shape from the entire periphery of the end section on an outer side in the vehicle width direction of the extended-out section 42, hence rigidity of the lower section of the pillar inner panel 32 is more increased. Moreover, as shown in FIG. 6 as an example, the first upper surface section 52U of the first upper wall section 52A and the second upper surface section 52V of the second upper wall section 52B are joined on the upper end section side of the rocker 50, whereby the level difference surface 52X facing an outer side in the vehicle width direction is formed, and in the lower end section of the reinforcing section 60, the lower side projecting section 62B which is part of the projecting section 62 is joined to the level difference surface 52X on the upper end section side of the rocker 50. Therefore, in cases in which a load attempting to displace the pillar inner panel 32 to the upper side of the vehicle has acted during a collision, for example, the previously mentioned load acts, on the joining section of the level difference surface 52X and the projecting section 62, as a load in a shearing direction, not as a load in a detaching direction, hence the reinforcing section 60 is less readily detached from the rocker 50 compared to in a structure of the kind where, for example, a load in the detaching direction is received.

As described above, due to the vehicle side structure of the present embodiment, a configuration having the retractor mounting-dedicated opening 32F formed in the lower section of the pillar inner panel 32 makes it possible for rigidity of the lower section of the pillar inner panel 32 to be improved even when a separate reinforcing member is not provided.

Supplementary Description of Embodiments

Note that as a modified example of the above-described first embodiment shown in FIGS. 1 to 3, it is possible to adopt also a configuration in which the lower wall section (42B) which is the lower section in the extended-out section (42) is joined to a middle section in the vehicle width direction of the upper surface section (20U) in the rocker inner panel (20). Moreover, as a modified example of the above-described second embodiment shown in FIGS. 4 to 6, it is possible to adopt also a configuration in which the lower wall section (42B) which is the lower section in the extended-out section (42) is joined to the first upper surface section (52U) of the rocker (50).

Moreover, as a modified example of the above-described second embodiment, it is possible to adopt also a configuration where, for example, the lower wall section (42B)

which is the lower section in the extended-out section (42) of the reinforcing section (60) is separated from the first upper surface section (52U) of the rocker (50), not making surface contact with the first upper surface section (52U) of the rocker (50).

Moreover, as a modified example of the above-described second embodiment, it is possible to adopt also a configuration where, for example, by the middle section in the vehicle width direction of the upper wall section (52) configuring the upper end section side of the rocker (50) being recessed to the lower side of the vehicle whereby a recessed bead section extending in the vehicle front-rear direction is formed in the upper wall section (52) configuring the upper end section side of the rocker (50), the level difference surface facing an outer side in the vehicle width direction may be formed in the upper wall section (52) configuring the upper end section side of the rocker (50), and the lower side projecting section (62B) of the reinforcing section (60) is joined to the previously described level difference surface.

Moreover, as a modified example of the above-described first and second embodiments shown in FIGS. 1 to 6, the vertical wall-like inner wall section configuring the end section side on an inner side in the vehicle width direction of the rocker (18, 50) may be configured in a stepped shape when viewed from a vehicle front, whereby the ridge section is formed along the vehicle front-rear direction in the vertical wall-like inner wall section configuring the end section side on an inner side in the vehicle width direction of the rocker (18, 50), and the lower end section of the pillar inner panel (32) may be joined to the inner wall section of the rocker (18, 50) along such a ridge section.

Moreover, as a modified example of the above-described first and second embodiments, a means other than arc welding, such as, for example, laser welding (as an example, LSW (laser screw welding)), or the like, may be employed in joining of the reinforcing section (40, 60) and the rocker (18, 50).

Moreover, in the above-described first and second embodiments, the center pillar 30 is configured including the pillar outer RF 34. However, it is possible to adopt also a configuration in which the center pillar does not include the pillar outer RF 34.

Moreover, in the above-described first and second embodiments, the opening 32F formed in the lower section of the pillar inner panel 32 is configured as a retractor mounting-dedicated opening. However, it is also possible that an opening for mounting a device other than a retractor, such as, for example, an automatic driving-dedicated peripheral information detecting sensor device, or the like, is formed in the lower section of the pillar inner panel, and that a reinforcing section of similar configuration to the reinforcing sections 40, 60 of the above-described embodiments is formed integrally with such an opening. In addition, it is also possible that the opening, for mounting a device, formed at the lower section of the pillar inner panel of a pillar other than the center pillar, such as, for example, a rear pillar or front pillar, and so on, and that a reinforcing section of similar configuration to the reinforcing sections 40, 60 of the above-described embodiments is formed integrally with such an opening.

Note that the above-described embodiments and the above-mentioned plurality of modified examples can be implemented appropriately combined.

That concludes description of an example of the present invention. However, the present invention is of course not limited to the above, and can be implemented also in other than the above, by making a variety of modifications in a range not departing from the spirit of the present invention.

All of the documents, patent applications, and technical standards described in the present specification are incorporated by reference in the present specification to the same degree as if what was incorporated by reference by the individual documents, patent applications, and technical standards was specifically and individually described.

What is claimed is:

1. A vehicle side structure comprising:
a rocker disposed along a vehicle front-rear direction at a lower section of a vehicle side; and
a pillar disposed along a vehicle up-down direction at the vehicle side whereby a pillar lower end section of the pillar is joined to the rocker, the pillar comprising: a pillar inner panel disposed at a vehicle interior inner side, and a pillar outer panel disposed at a vehicle interior outer side of the pillar inner panel, and the pillar having an opening, for mounting a device, formed at a pillar inner panel lower section of the pillar inner panel,
the pillar inner panel having formed therein a reinforcing section comprising an extended-out section that extends out integrally toward an outer side in a vehicle width direction from an entire periphery of a peripheral edge of the opening, and a reinforcing section lower part of the reinforcing section being joined to an upper section of the rocker.

2. The vehicle side structure according to claim 1, wherein an extended-out section lower part of the extended-out section makes surface contact with an upper surface section of the rocker.

3. The vehicle side structure according to claim 2, wherein the rocker comprises:
a rocker inner panel that configures a part at an inner side, in the vehicle width direction, of the rocker and that has a cross-section, as viewed along the vehicle width direction, configured as a hat shape having an opening facing an outer side in the vehicle width direction;
a rocker outer panel that is disposed facing an outer side in the vehicle width direction of the rocker inner panel, that has a cross-section, as viewed along the vehicle width direction, configured as a hat shape having an opening facing an inner side in the vehicle width direction, and that, together with the rocker inner panel, forms a closed cross-section; and
an end section at an outer side in the vehicle width direction of the extended-out section lower part is joined to an upper surface section of the rocker inner panel along a connecting part connecting the upper surface section with an upper end flange section of the rocker inner panel.

4. The vehicle side structure according to claim 1, wherein
a vertical wall-like inner wall section configuring an end section side at an inner side, in the vehicle width direction, of the rocker has a ridge section formed along the vehicle front-rear direction, and
a pillar inner panel lower end section of the pillar inner panel is joined to the inner wall section of the rocker along the ridge section.

5. The vehicle side structure according to claim 1, wherein:
an end section at an outer side in the vehicle width direction of the reinforcing section comprises a projecting section that projects integrally in a flange shape from an entire periphery of an end section at an outer side in the vehicle width direction of the extended-out section, an upper end section side of the rocker has formed therein: a first upper surface section, a second upper surface section disposed further toward an outer side in the vehicle width direction than the first upper surface section whereby the second upper surface section is provided at a position that is lower in the vehicle up-down direction than the first upper surface section; and a level difference surface joining the first upper surface section and the second upper surface section, and the projecting section is joined to the level difference surface at a reinforcing section lower end part of the reinforcing section.

\* \* \* \* \*